US012619565B2

(12) United States Patent
Gu et al.

(10) Patent No.: US 12,619,565 B2
(45) Date of Patent: May 5, 2026

(54) SYSTEMS AND METHODS FOR SIMULATING DESKTOP BUS (D-BUS) SERVICES

(71) Applicant: Dell Products, L.P., Round Rock, TX (US)

(72) Inventors: Jun Gu, Austin, TX (US); Arun Muthaiyan, Round Rock, TX (US); Thomas William Erdman, Austin, TX (US); Kang Quan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 144 days.

(21) Appl. No.: 18/490,229

(22) Filed: Oct. 19, 2023

(65) Prior Publication Data

US 2025/0130965 A1 Apr. 24, 2025

(51) Int. Cl.
*G06F 13/36* (2006.01)

(52) U.S. Cl.
CPC .................................... *G06F 13/36* (2013.01)

(58) Field of Classification Search
CPC ....................................................... G06F 13/36
See application file for complete search history.

(56) References Cited

U.S. PATENT DOCUMENTS

| 10,880,347 B1 * | 12/2020 | Krishnan ........... H04N 21/4431 |
| 2007/0038435 A1 * | 2/2007 | Koizumi ............. G06F 9/45537 |
| | | 703/27 |

| 2014/0254595 A1 * | 9/2014 | Luo ...................... H04W 40/246 |
| | | 370/392 |
| 2021/0240567 A1 * | 8/2021 | Hsu ...................... G06F 13/4282 |
| 2023/0409365 A1 * | 12/2023 | Kamar ................ G06F 9/45545 |
| 2024/0134989 A1 * | 4/2024 | Veluthakkal .......... G06F 21/575 |
| 2024/0354181 A1 * | 10/2024 | Sathyanarayana ........................... |
| | | G06F 11/3409 |
| 2025/0130829 A1 * | 4/2025 | Gu ...................... G06F 9/45504 |
| 2025/0130964 A1 * | 4/2025 | Stracener ................ G06F 13/36 |

OTHER PUBLICATIONS 2015 of May Margiol , d-bus testing, 2015 (Year: 2015).*
Wiki , 2021 Wikipedia, D-bus, 2021, https://en.wikipedia.org/wiki/D-bus (Year: 2021).*

* cited by examiner

*Primary Examiner* — Henry Tsai
*Assistant Examiner* — Christopher A Daley
(74) *Attorney, Agent, or Firm* — Fogarty LLP

(57) ABSTRACT

Embodiments of the present disclosure provide a system and method to simulate property values generated by Desktop Bus (D-Bus) objects. According to one embodiment, an Information Handling System (IHS) includes multiple D-Bus services that communicate among one another using a D-Bus with executable instructions to generate a D-Bus simulation service that communicates with one or more other D-Bus services through a D-Bus, and sends simulation test data to one of the other D-Bus services in response to a request from the one other D-Bus service.

12 Claims, 6 Drawing Sheets

SYSTEMS AND METHODS FOR SIMULATING DESKTOP BUS (D-BUS) SERVICES

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Modern day IHS administrative management is often provided via baseboard management controllers (BMCs). The baseboard management controller (BMC) generally includes a specialized microcontroller embedded in the IHS, and may provide an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take certain corrective actions, such as resetting or power cycling the system to get a hung O/S running again. These abilities can often save on the total cost of ownership of an IHS, particularly when implemented in large clusters, such as server farms.

SUMMARY

Embodiments of the present disclosure provide a system and method to simulate property values generated by Desktop Bus (D-Bus) objects. According to one embodiment, an Information Handling System (IHS) includes multiple D-Bus services that communicate among one another using a D-Bus with executable instructions to generate a D-Bus simulation service that communicates with one or more other D-Bus services through a D-Bus, and sends simulation test data to one of the other D-Bus services in response to a request from the one other D-Bus service.

According to another embodiment, a D-Bus service simulation method includes the steps of generating a D-Bus simulation service that communicates with one or more other D-Bus services through a D-Bus, and sending simulation test data to one of the other D-Bus services in response to a request from the one other D-Bus service.

According to yet another embodiment, a memory storage device with program instructions stored thereon that, upon execution by one or more processors of a client HIS cause it to generate a Desktop Bus (D-Bus) simulation service that communicates with one or more other D-Bus services through a D-Bus, and send simulation test data to one of the other D-Bus services in response to a request from the one other D-Bus service.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1A:
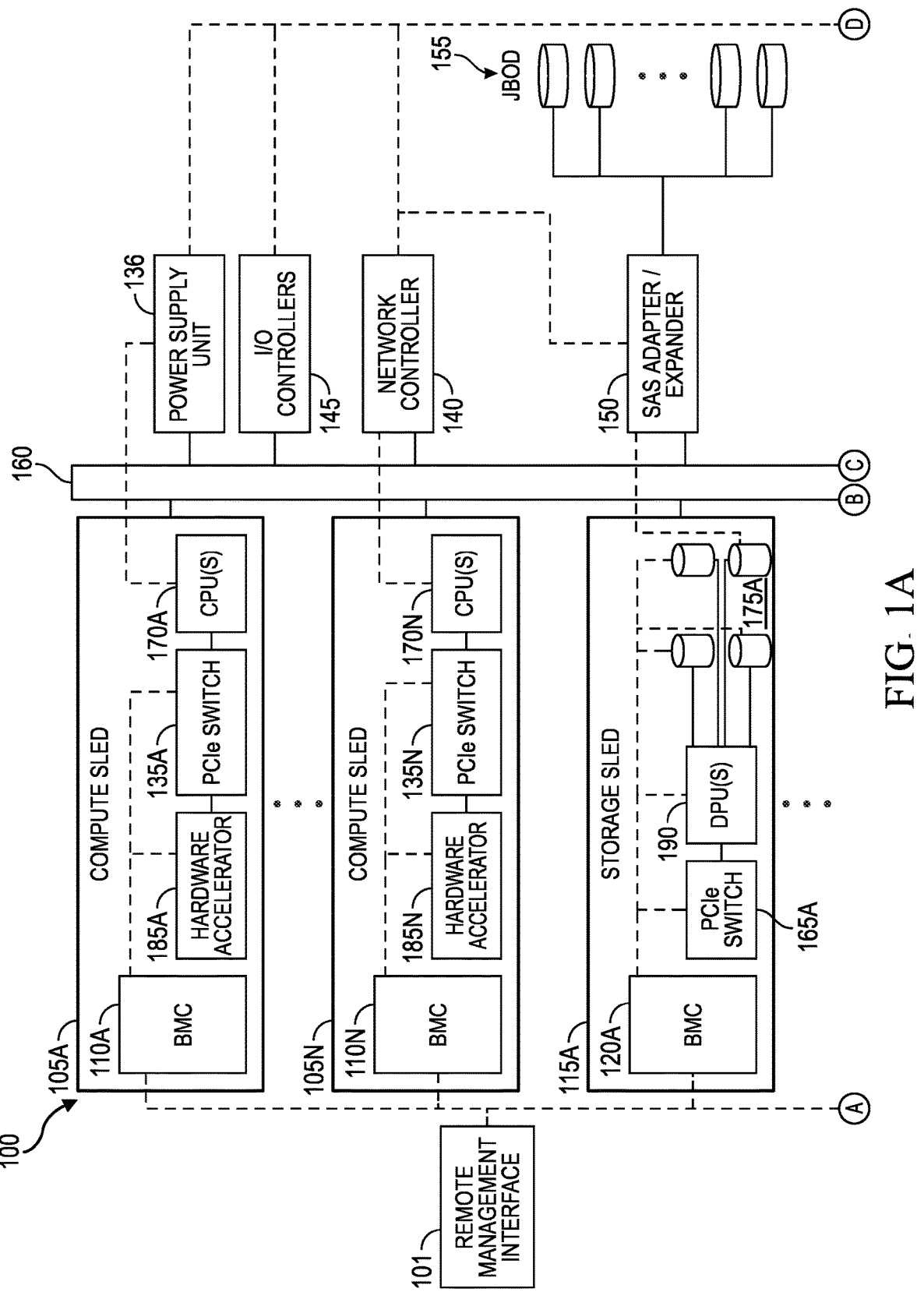
FIGS. 1A and 1B is a block diagram illustrating certain components of a chassis comprising one or more compute sleds and one or more storage sleds that may be configured to implement the systems and methods described according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard specifications, such as the Intelligent Platform Management Interface (IPMI) and Systems Management Architecture of Server Hardware (SMASH) for computer system administration. The BMC may include a processor, memory, and an out-of-band network interface separate from and physically isolated from an in-band network interface of the IHS, and/or other embedded resources. In certain embodiments, the BMC may include or may be part of a Remote Access Controller (e.g., a DELL Remote Access Controller (DRAC) or an Integrated DRAC (iDRAC)).

The BMC firmware is normally proprietary and is often developed by the vendor and shipped along with the BMC to the end user. Nevertheless, industry trends have migrated toward custom BMC firmware stacks (e.g., operating systems) that allow the end user greater control over how the BMC operates. OpenBMC is one example standard under which custom BMC firmware stacks may be generated. In general, openBMC is a collaborative open-source Linux distribution for BMCs meant to work across heterogeneous systems that include enterprise, high-performance computing (HPC), telecommunications, and cloud-scale data centers.

Advances in BMC design has led to the development of an Inter-Process Communication (IPC) and remote procedure call (RPC) mechanism, such as Desktop Bus (D-Bus), which typically operate outside the operating-system space. D-Bus is usually provided as a "daemon" process that functions in the background to effectively facilitate exchange of IPC messages between processes that provide various services. Implementation of D-Bus in BMCs are advantageous in that it provides for abstraction of invoking interfaces of a service and responding to interface invocations. Thus, the service may be shielded from, among other things, serialization and deserialization of data shared with other services, thus yielding portable services that may be easily migrated from one platform to another. Because D-Bus is a standard feature provided by the openBMC platform, it may be beneficial to re-use established services on other platforms, such as vendor-based platforms, such as Open Server Manager (OMS) provided by DELL TECHNOLOGIES and vice-versa.

Nevertheless, while implementation of d-bus in BMCs may provide enhanced manageability, transparency, and customization, its implementation has not been without drawbacks. For example, multiple stages exist in the development of D-Bus-based BMCs where different numerous individuals may need to collaborate with each other to validate its various features. During the development phase, multiple teams, each with their own coding segments can struggle with full test coverage when other individual's code segments do not yet exist or is only partially completed. As such, covering all failure scenarios can be a relatively difficult endeavor. This problem may include partially completed hardware as well as partially completed software modules.

In the product validation phase, development teams may have difficulty covering real world customer failures which may not be easily recreated. Additionally for some corner testing cases, the tester may not uncover an issue in a regular test environment and would need a special setup or process to trigger a particular failure mode, such as simulating an excessively high temperature in a testing environment. Additionally, if a feature has multiple dependent modules, the dependency between each module may delay feature completion. As such, enabling parallel feature development and validation may be beneficial during development.

Conventional attempts to solve these problems have included modifying existing code for different modules to inject simulation data and logic as well as duplicating D-Bus objects for validation. Nevertheless, both methods need knowledge of each module and require extra memory. They both typically require additional overhead to make code changes, build a special image, and test code management for each test case. As will be described in detail herein below, embodiments of the present disclosure provide a D-Bus simulation system and method that generates a D-Bus simulation service to simulate one or more properties in a D-Bus-based BMC so that the level of platform testing may be enhanced.

Figure 1B:
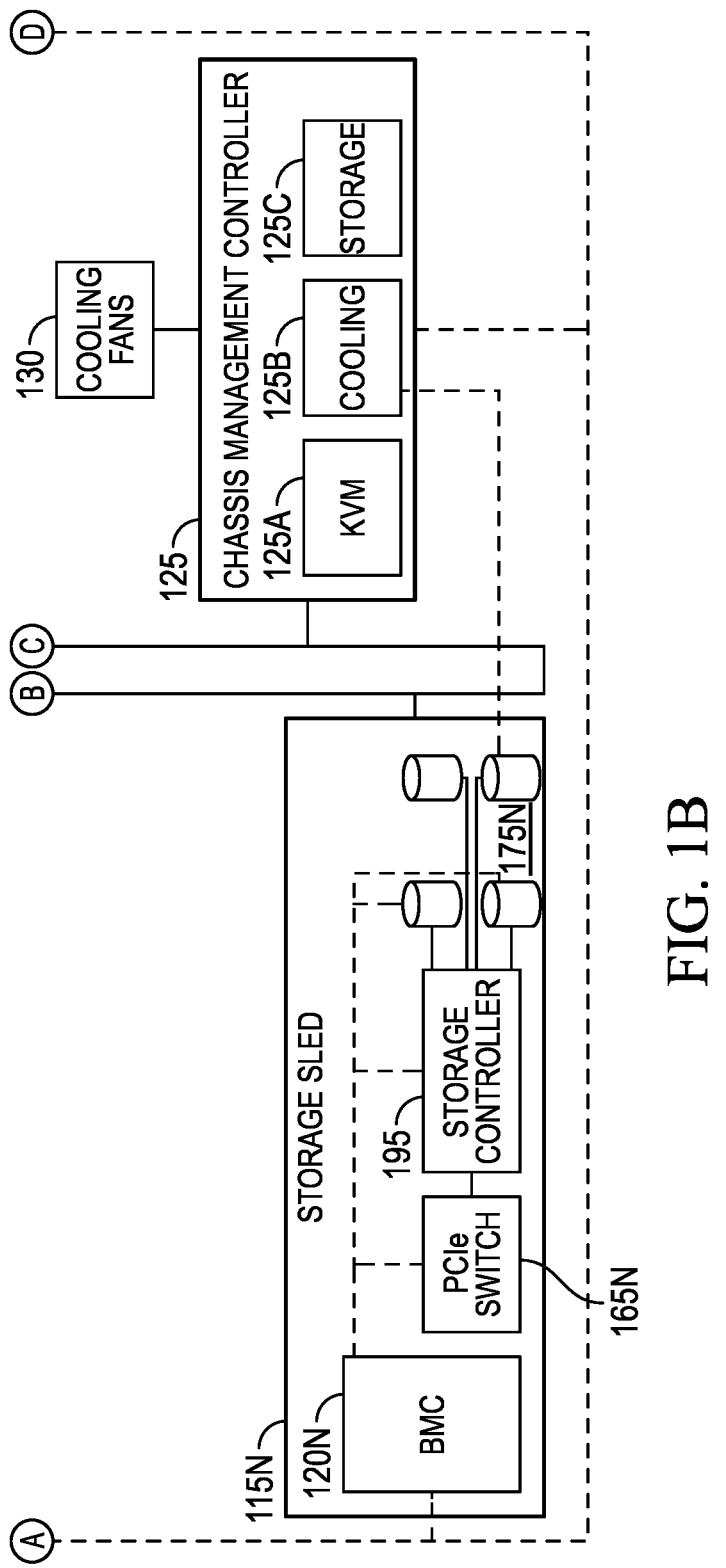

FIGS. 1A and 1B is a block diagram illustrating certain components of a chassis 100 comprising one or more compute sleds 105a-n and one or more storage sleds 115a-n that may be configured to implement the systems and methods described according to one embodiment of the present disclosure. Embodiments of chassis 100 may include a wide variety of hardware configurations in which one or more sleds 105a-n, 115a-n are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removable sleds 105a-n, 115a-n that are installed in the chassis. In addition, once the chassis 100 has been deployed, firmware used by individual hardware components of the sleds 105a-n, 115a-n, or by other hardware components of chassis 100, may be modified in order to update the operations that are supported by these hardware components.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with diverse types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power, and network bandwidth, to be shared by the compute sleds 105a-n and storage sleds 115a-n, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the sleds 105a-n, 115a-n of the chassis. These high-speed data links may be used to support algorithm implementations that span multiple processing, networking, and storage components of an IHS and/or chassis 100. For instance, computational tasks may be delegated to a specific processing component of an IHS, such as to a hardware accelerator 185*a-n* that may include one or more programmable processors that operate separate from the main CPUs 170*a-n* of computing sleds 105*a-n*. In various embodiments, such hardware accelerators 185*a-n* may include DPUs (Data Processing Units), GPUs (Graphics Processing Units), SmartNICs (Smart Network Interface Card) and/or FPGAs (Field Programmable Gate Arrays). These hardware accelerators 185*a-n* operate according to firmware instructions that may be occasionally updated, such as to adapt the capabilities of the respective hardware accelerators 185*a-n* to specific computing tasks.

Chassis 100 may be installed within a rack structure that provides at least a portion of the cooling utilized by the sleds 105*a-n*, 115*a-n* installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105*a-n*, 115*a-n* installed within the chassis. In this manner, a rack and a chassis 100 installed within the rack may utilize various configurations and combinations of cooling fans 130 to cool the sleds 105*a-n*, 115*a-n* and other components housed within chassis 100.

The sleds 105*a-n*, 115*a-n* may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105*a-n*, 115*a-n* to backplane 160 include PCIe couplings that support high-speed data links with the sleds 105*a-n*, 115*a-n*. In various embodiments, backplane 160 may support diverse types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 136.

Figure 2:
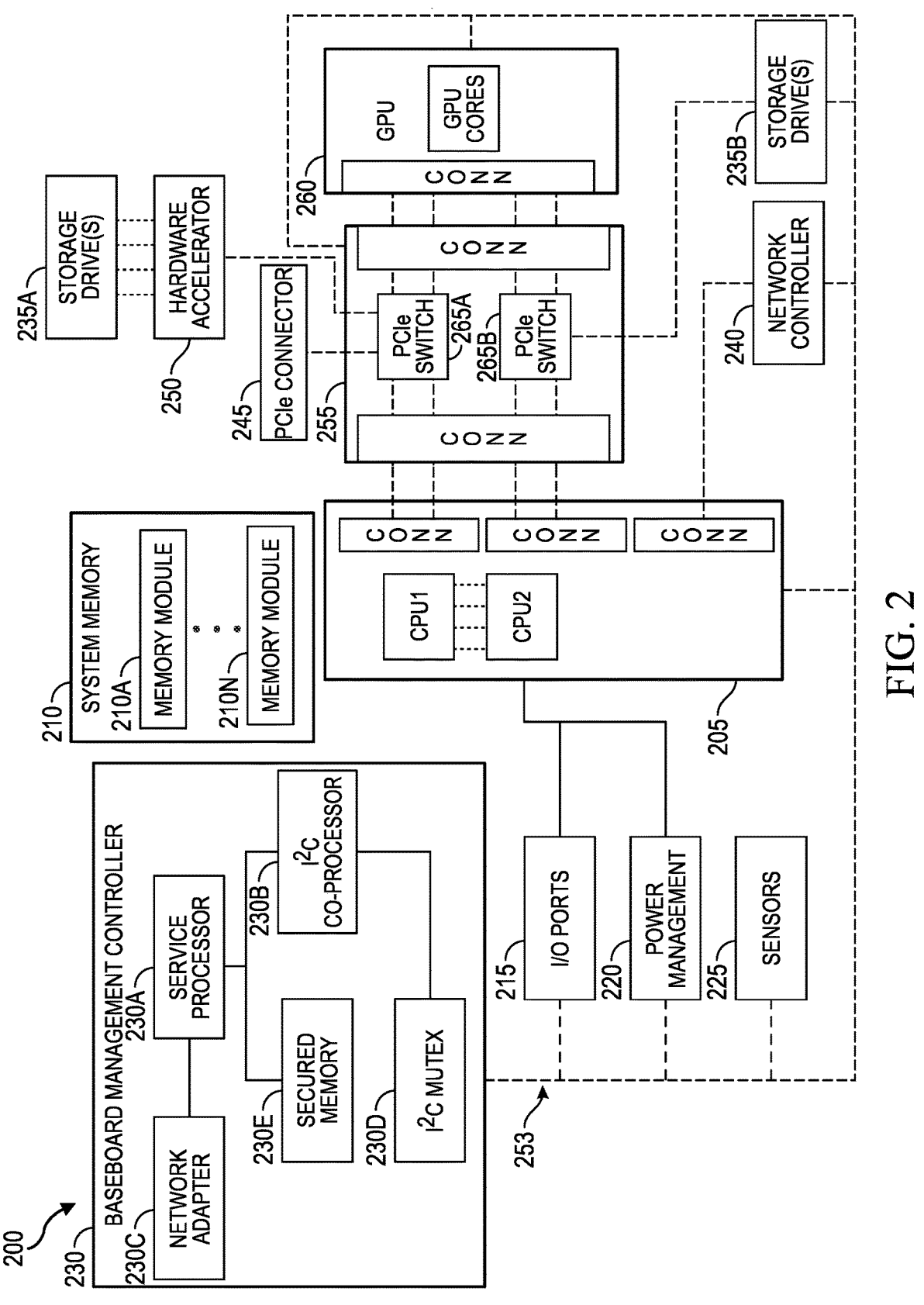
FIG. 2 illustrates an example of an IHS configured to implement systems and methods described herein according to one embodiment of the present disclosure.

In certain embodiments, each individual sled 105*a-n*, 115*a-n-n* may be an IHS such as described with regard to IHS 200 of FIG. 2. Sleds 105*a-n*, 115*a-n* may individually or collectively provide computational processing resources that may be used to support a variety of e-commerce, multimedia, business, and scientific computing applications, such as artificial intelligence systems provided via cloud computing implementations. Sleds 105*a-n*, 115*a-n* are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are expected in the administration and operation of data centers, but it is preferable to avoid any downtime in making such firmware updates. For instance, in updating the firmware of the individual hardware components of the chassis 100, it is preferable that such updates can be made without having to reboot the chassis. As described in additional detail below, it is also preferable that updates to the firmware of individual hardware components of sleds 105*a-n*, 115*a-n* be likewise made without having to reboot the respective sled of the hardware component that is being updated.

As illustrated, each sled 105*a-n*, 115*a-n* includes a respective Baseboard Management Controller (BMC) 110*a-n*, 120*a-n* also known as a remote access controller (RAC). As described in additional detail with regard to FIG. 2, BMC 110*a-n*, 120*a-n* provides capabilities for remote monitoring and management of a respective sled 105*a-n*, 115*a-n* and/or of chassis 100. In support of these monitoring and management functions, BMCs 110*a-n* may utilize both in-band and sideband (i.e., out-of-band) communications with various managed components of a respective sled 105*a-n* and chassis 100. Remote access controllers 110*a-n*, 120*a-n* may collect diverse types of sensor data, such as collecting temperature sensor readings that are used in support of airflow cooling of the chassis 100 and the sleds 105*a-n*, 115*a-n*. In addition, each BMC 110*a-n*, 120*a-n* may implement various monitoring and administrative functions related to a respective sled 105*a-n*, 115*a-n*, where these functions may be implemented using sideband bus connections with various internal components of the chassis 100 and of the respective sleds 105*a-n*, 115*a-n*. As described in additional detail below, in various embodiments, these capabilities of the BMCs 110*a-n*, 120*a-n* may be utilized in updating the firmware of hardware components of chassis 100 and/or of hardware components of the sleds 105*a-n*, 115*a-n*, without having to reboot the chassis or any of the sleds 105*a-n*, 115*a-n*.

The BMCs 110*a-n*, 120*a-n* that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to all of the storage drives 175*a-n* installed in a chassis 100, or to all of the storage drives 175*a-n* of a particular model or manufacturer. In some instances, remote management interface 101 may include an inventory of the hardware, software, and firmware of chassis 100 that is being remotely managed through the operation of the BMCs 110*a-n*, 120*a-n*. The remote management interface 101 may also include various monitoring interfaces for evaluating telemetry data collected by the BMCs 110*a-n*, 120*a-n*. In some embodiments, remote management interface 101 may communicate with BMCs 110*a-n*, 120*a-n* via a protocol such the Redfish remote management interface.

In the illustrated embodiment, chassis 100 includes one or more compute sleds 105*a-n* that are coupled to the backplane 160 and installed within one or more bays or slots of chassis 100. Each of the individual compute sleds 105*a-n* may be an IHS, such as described with regard to FIG. 2. Each of the individual compute sleds 105*a-n* may include various different numbers and types of processors that may be adapted to performing specific computing tasks. In the illustrated embodiment, each of the compute sleds 105*a-n* includes a PCIe switch 135*a-n* that provides access to a hardware accelerator 185*a-n*, such as the described DPUs, GPUs, Smart NICs and FPGAs, which may be programmed and adapted for specific computing tasks, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be an integrated component of a DPU 190. The immense data storage and retrieval capabilities provided by such storage sled 115a implementations may be harnessed by offloading storage operations directed as storage drives 175a to a DPU 190a, and thus without relying on the main CPU of the storage sled, or of any other component of chassis 100. As indicated in FIG. 1, chassis 100 may also include one or more storage sleds 115n that provide access to storage drives 175n via a storage controller 195. In some embodiments, storage controller 195 may provide support for RAID (Redundant Array of Independent Disks) configurations of logical and physical storage drives, such as storage drives provided by storage sled 115n. In some embodiments, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed components of chassis 100 and/or may be installed elsewhere within a rack that houses the chassis 100. In certain scenarios, such storage drives 155 may be accessed via a SAS expander 150 that is coupled to the backplane 160 of the chassis 100. The SAS expander 150 may support connections to a number of JBOD (Just a Bunch of Disks) storage drives 155 that, in some instances, may be configured and managed individually and without implementing data redundancy across the various drives 155. The additional storage drives 155 may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed. In some instances, a chassis 100 may include numerous storage drives 175a-n, 155 that are identical, or nearly identical, such as arrays of SSDs of the same manufacturer and model. Accordingly, any firmware updates to storage drives 175a-n, 155 require the updates to be applied within each of these topologies being supported by the chassis 100. Despite the substantial number of different storage drive topologies that may be supported by an individual chassis 100, the firmware used by each of these storage devices 175a-n, 155 may be occasionally updated. In some instances, firmware updates may be limited to a single storage drive, but in other instances, firmware updates may be initiated for a large number of storage drives, such as for all SSDs installed in chassis 100.

As illustrated, the chassis 100 of FIG. 1 includes a network controller 140 that provides network access to the sleds 105a-n, 115a-n installed within the chassis. Network controller 140 may include various switches, adapters, controllers, and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated.

Chassis 100 may also include various I/O controllers 145 that may support various I/O ports, such as USB ports that may be used to support keyboard and mouse inputs and/or video display capabilities. Each of the I/O controllers 145 may operate according to firmware instructions that may be occasionally updated. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power supply unit 135, network controller 140 and airflow cooling fans 130 that are available via the chassis 100. As described, the airflow cooling fans 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein according to one embodiment of the present disclosure. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105*a-n*, 115*a-n*, or other type of server, such as an 1RU server installed within a 2RU chassis, which is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the HIS 200, in some cases using a high-speed memory bus. The system memory 210 is coupled to CPUs 205 via one or more memory buses 205*a* that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210*a-n*. Each of the removable memory modules 210*a-n* may correspond to a printed circuit board memory socket that receives a removable memory module 210*a-n*, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to diverse types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line buses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the HIS 200. Upon powering or restarting IHS 200, CPUs 205 may utilize BIOS instructions to initialize and test hardware components coupled to the HIS 200, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the BMC 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of HIS 200, such as the BIOS and boot loader of IHS 200. These calculated hash values may then be compared against reference hash values that were previously stored in a secure non-volatile memory of the HIS 200, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. Each of the PCIe switches 265a-b may operate according to firmware instructions that may be occasionally updated.

Using the available PCIe lanes, the PCIe switches 265a-b may be used to implement a PCIe switch fabric. Also through this switch fabric, PCIe NVMe (Non-Volatile Memory Express) transmission may be supported and utilized in high-speed communications with SSDs, such as storage drives 235a-b, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235a-b in various topologies, in the same manner as described with regard to the chassis 100 of FIG. 1. In the illustrated embodiment, storage drives 235a are accessed via a hardware accelerator 250, while storage drives 235b are accessed directly via PCIe switch 265b. In some embodiments, the storage drives 235a-b of IHS 200 may include a combination of both SSD and magnetic disk storage drives. In other embodiments, all of the storage drives 235a-b of IHS 200 may be identical, or nearly identical. In all embodiments, storage drives 235a-b operate according to firmware instructions that may be occasionally updated.

As illustrated, PCIe switch 265a is coupled via a PCIe link to a hardware accelerator 250, such as a DPU, Smart-NIC, GPU and/or FPGA, that may be a connected to the HIS 200 via a removable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, which may be used to implement functions used to support devices coupled to the IHS 200. In some embodiments, the processing cores of hardware accelerator 250 include ARM (advanced RISC (reduced instruction set computing) machine) processing cores. In other embodiments, the cores of the DPUs may include MIPS (microprocessor without interlocked pipeline stages) cores, RISC-V cores, or CISC (complex instruction set computing) (i.e., x86) cores. Hardware accelerator 250 may operate according to firmware instructions that may be occasionally updated.

In the illustrated embodiment, the programmable capabilities of hardware accelerator 250 implement functions used to support storage drives 235a, such as SSDs. In such storage drive topologies, hardware accelerator 250 may implement processing of PCIe NVMe communications with storage drives 235a, thus supporting high-bandwidth connections with the storage drives. Hardware accelerator 250 may also include one or more memory devices used to store program instructions executed by the processing cores and/or used to support the operation of storage drives 235a such as in implementing cache memories and buffers utilized in support of high-speed operation of these storage drives, and in some cases may be used to provide high-availability and high-throughput implementations of the read, write and other I/O operations that are supported by these storage drives 235a. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions.

As illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each GPU card may include one or more GPUs 260. In some embodiments, PCIe switches 265a-b may transfer instructions and data for generating video images by the GPUs 260 to and from CPUs 205. Accordingly, GPUs 260 may include one or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265a-b may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to HIS 200. Through couplings to PCIe connectors 245, a variety of data storage devices, graphics processors and network interface cards may be coupled to IHS 200, thus supporting a wide variety of topologies of devices that may be coupled to the IHS 200.

As described, IHS 200 includes a BMC 230 that supports remote management of IHS 200 and of various internal components of IHS 200. In certain embodiments, BMC 230 may operate from a different power plane from the processors 205 and other components of IHS 200, thus allowing the BMC 230 to operate, and management tasks to proceed, while the processing cores of IHS 200 are powered off. Various functions provided by the BIOS, including launching the operating system of the IHS 200, and/or functions of a TPM may be implemented or supplemented by the BMC 230. In some embodiments, the BMC 230 may perform various functions to verify the integrity of the IHS 200 and its hardware components prior to initialization of the operating system of IHS 200 (i.e., in a bare-metal state). In some embodiments, certain operations of the BMC 230, such as the operations described herein for updating firmware used by managed hardware components of IHS 200, may operate using validated instructions, and thus within the root of trust of IHS 200.

In some embodiments, BMC 230 may include a service processor 230a, or specialized microcontroller, which operates management software that supports remote monitoring and administration of IHS 200. The management operations supported by BMC 230 may be remotely initiated, updated, and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the BMC 230 may utilize information collected by various managed sensors 225 located within the HIS 200. For instance, temperature data collected by sensors 225 may be utilized by the BMC 230 in support of closed-loop airflow cooling of the IHS 200. As indicated, BMC 230 may include a secured memory 230e for exclusive use by the BMC 230 in support of management operations.

In some embodiments, BMC 230 may implement monitoring and management operations using MCTP (Management Component Transport Protocol) messages that may be communicated to managed devices 205, 235a-b, 240, 250, 255, 260 via management connections supported by a sideband bus 253. In some embodiments, the BMC 230 may additionally or alternatively use MCTP messaging to transmit Vendor Defined Messages (VDMs) via the in-line PCIe switch fabric supported by PCIe switches 265a-b. In some instances, the sideband management connections supported by BMC 230 may include PLDM (Platform Level Data Model) management communications with the managed devices 205, 235a-b, 240, 250, 255, 260 of IHS 200.

As illustrated, BMC 230 may include a network adapter 230c that provides the BMC with network access that is separate from the network controller 240 utilized by other hardware components of the IHS 200. Through secure connections supported by network adapter 230c, BMC 230 communicates management information with remote management interface 101. In support of remote monitoring functions, network adapter 230c may support connections between BMC 230 and external management tools using wired and/or wireless network connections that operate using a variety of network technologies. As a non-limiting example of a BMC, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an HIS 200 via a sideband bus interface 253. For instance, messages utilized in device and/or system management may be transmitted using I2C sideband bus 253 connections that may be individually established with each of the respective managed devices 205, 235a-b, 240, 250, 255, 260 of the IHS 200 through the operation of an I2C multiplexer 230d of the BMC 230. As illustrated in FIG. 2, the managed devices 205, 235a-b, 240, 250, 255, 260 of IHS 200 are coupled to the CPUs 205, either directly or directly, via in-line buses that are separate from the I2C sideband bus 253 connections used by the BMC 230 for device management.

In certain embodiments, the service processor 230a of BMC 230 may rely on an I2C co-processor 230b to implement sideband I2C communications between the BMC 230 and the managed hardware components 205, 235a-b, 240, 250, 255, 260 of the IHS 200. The I2C co-processor 230b may be a specialized co-processor or micro-controller that is configured to implement an I2C bus interface used to support communications with managed hardware components 205, 235a-b, 240, 250, 255, 260 of HIS 200. In some embodiments, the I2C co-processor 230b may be an integrated circuit on the same die as the service processor 230a, such as a peripheral system-on-chip feature that may be provided by the service processor 230a. The sideband I2C bus 253 is illustrated as single line in FIG. 2. However, sideband bus 253 may be comprised of multiple signaling pathways, where each may be comprised of a clock line and data line that couple the BMC 230 to I2C endpoints 205, 235a-b, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
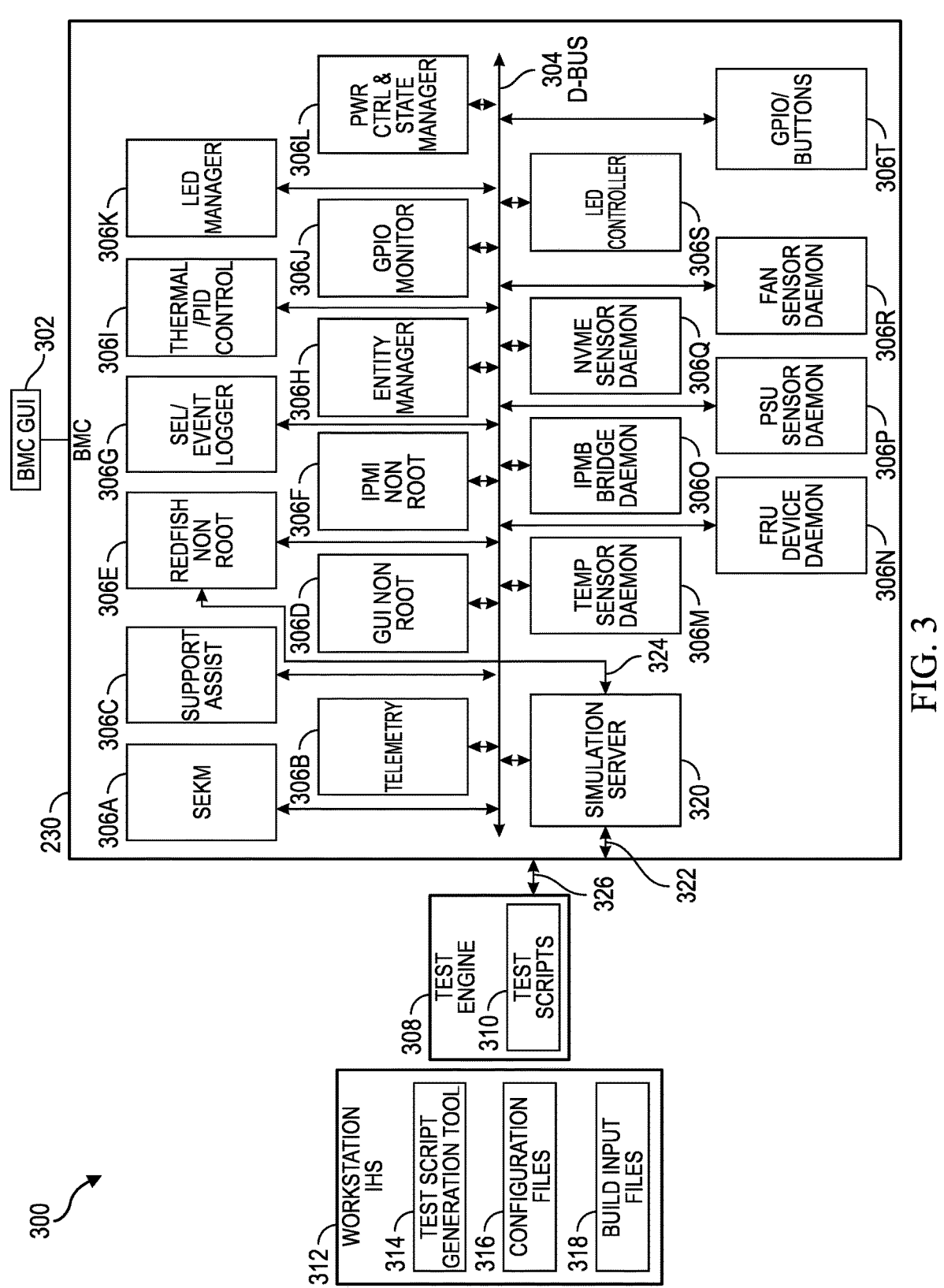
FIG. 3 is a diagram illustrating several components of a Desktop Bus (D-Bus) service simulation system that may be used to simulate test data conveyed through a D-Bus enabled BMC according to one embodiment of the present disclosure.

FIG. 3 is a diagram illustrating several components of a D-Bus service simulation system 300 that may be used to simulate test data conveyed through a D-Bus enabled RAC 230 according to one embodiment of the present disclosure. The D-Bus service simulation system 300 includes an IHS 200 configured with a BMC 230, which is itself configured with a D-Bus layer 304. The IHS 200, BMC 230, and D-Bus layer 304 may be collectively referred to as a Device Under Test (DUT) that undergoes tests conducted by a test engine 308. For example, the test engine 308 may store and execute one or more test scripts 310 that have been generated by a workstation IHS 312 comprising a test script generation tool 314, object simulation files and platform configuration files 316, and Build input files 318 (e.g., YAML files, mapping files, schema files, etc.). The test engine 308 may be any type configured with at least one memory and at least one processor executing the test scripts 310.

The services 306 using the D-Bus 304 may be any suitable type. As shown, services 306 that use the D-Bus 304 may include a Secure Enterprise Key Manager (SEKM) module 306a, a telemetry module 306b, a support assist module 306c, a non-root GUI module 306d, a non-root redfish module 306e, an Intelligent Platform Management Interface (IPMI) module 306f, a SEL/Event logger module 306g, an entity manager 306h, a thermal/PID control module 306i, a GPIO monitor 306j, a LED manager 306k, a power control and state manager 306l, a temp sensor daemon 306m, a Field Replaceable Unit (FRU) device daemon 306n, an IPMB bridge daemon 3060, a Power Supply Unit (PSU) sensor daemon 306p, an NVMe sensor daemon 306q, a fan sensor daemon 306r, an LED controller module 306s, and a GPIO/Buttons module 306t. It should be appreciated that other embodiments may have additional, fewer, or different services 306 than what is shown and described herein.

In one embodiment, the D-Bus service simulation system 300 may be used to simulate property values generated by the services 306 of a BMC 230. Nevertheless, it is contemplated that the D-Bus service simulation system 300 may be used to test any computing device that includes a D-Bus layer. The D-Bus service simulation system 300 may be particularly beneficial when used with BMCs 230, which are implemented with D-Bus because, among other things, D-Bus is supported with numerous third party D-Bus services. That is, developers would like to have the ability to re-use established D-Bus-based code rather develop that code from scratch. Nevertheless, the development of D-Bus-enabled devices often incur problems when large numbers of developers or engineers need to collaborate to ensure that their individual portion of software or hardware functions properly.

During the development phase, multiple teams, each with their own coding segments can struggle with full test coverage when other's code segments do not yet exist or is only partially completed. As such, covering all failure scenarios can be a relatively difficult endeavor. Additionally, development teams may have difficulty covering real world customer failures which are not easily recreated. Additionally for some corner testing cases, the tester may not uncover an issue in a regular test environment and would need a special setup or process to simulate each condition. Additionally, if a feature has multiple services 306 that are dependent upon one another, testing, in many cases, cannot be completed until all individual parties are ready to begin the testing phase. Embodiments of the present disclosure provide a solution to these problems, among others, via a simulation service 320 that communicates with one or more other D-Bus services 306 through a D-Bus layer 304, and sends simulation test data to one of the other D-Bus services 306 in response to requests, such as from the test engine 308 or from another one of the D-Bus services 306.

To provide a particular example, a test script 310 running on the test engine 308 may assign one or more simulated values to certain properties in the simulation service 320 via an SSH connection 322 followed by communicating through a redfish service 306e via link 326 to test whether the simulated data 324 is properly received or not. The simulation service 320 may simulate any service 306, which in the present example embodiment is the PSU sensor service 306q. To do so, the PSU sensor service 306q may be overridden by the simulation service 320 as is common in Object Oriented programming principles. Thus, the simulation service 320 may have a name similar to the service 306 such that calls to that service from other services 306 may be accomplished seamlessly.

Figure 4:
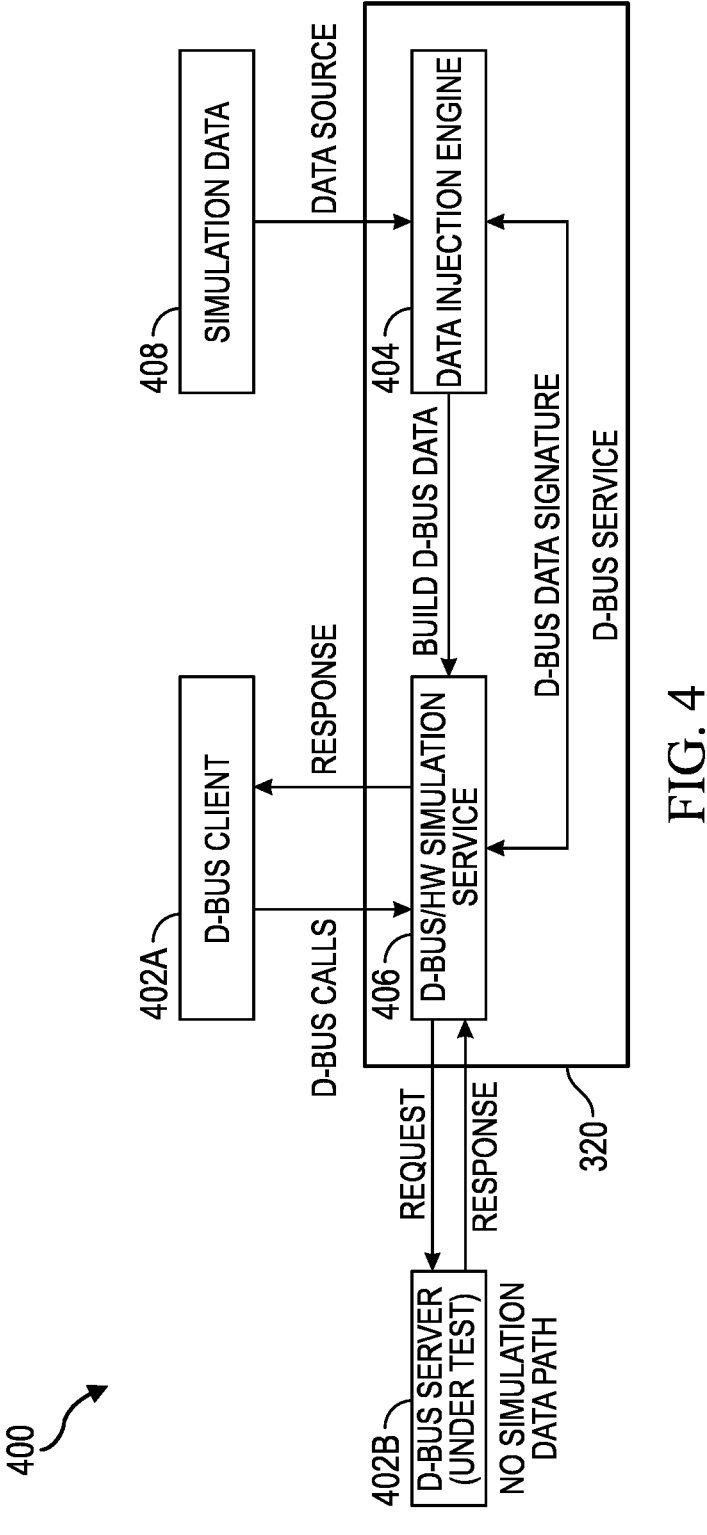
FIG. 4 is a block diagram showing how the simulation service may operate with a first service functioning as a client to simulate certain properties generated by a second service functioning as a server according to one embodiment of the present disclosure.

FIG. 4 is a block diagram 400 showing how the simulation service 320 may operate with a first service 402a functioning as a client to simulate certain properties generated by a second service 402b functioning as a server according to one embodiment of the present disclosure. The simulation service 320 includes a data injection engine 404 and a D-Bus hardware simulation service 406. The data injection engine 404 receives simulation data (e.g., property values) 408, such as from the test engine 308, and stores the simulation data 408 in the D-Bus hardware simulation service 406. At a later point in time when the first service 402a issues a request to the second service 402b, the D-Bus hardware simulation service 406 may return the requested simulation data.

In one embodiment, the D-Bus hardware simulation service 406 may include logic to determine whether a response to a requested value should be an assigned simulated value or an actual value obtained from the service it is intended to simulate. For example, the simulation service 320 may be configured to return a simulated value associated with a first property stored in the D-Bus hardware simulation service 406, and access the second service 402b to obtain an actual measured property value generated by the second service 402b.

Figure 5:
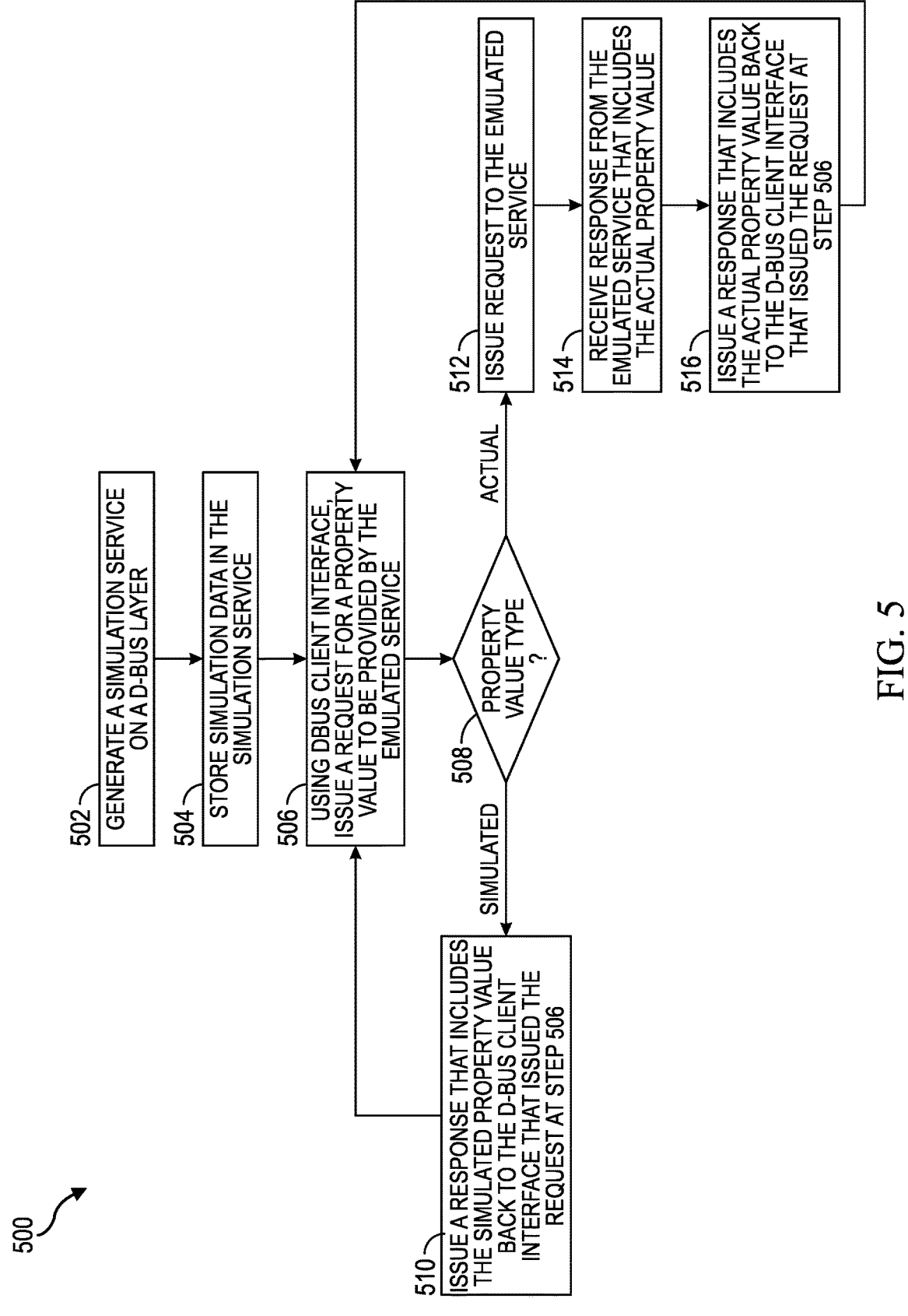
FIG. 5 illustrates an example D-Bus service simulation method showing how a simulation service may be generated to simulate some, most, or all property values of a D-Bus service according to one embodiment of the present disclosure.

FIG. 5 illustrates an example D-Bus service simulation method 500 showing how a simulation service 320 may be generated to simulate some, most, or all property values of a D-Bus service according to one embodiment of the present disclosure. Additionally or alternatively, the D-Bus service simulation method 500 may be performed in whole or in part, by the D-Bus service simulation system 300 as shown and described above with reference to FIGS. 3 and 4. The D-Bus service simulation method 500 may be performed any time all or part of a service 306 is to be simulated, such as during a testing phase of product development. In one embodiment, the method 500 may be performed by a test script 310 executed by a test engine 308.

The D-Bus service simulation method 500 described herein as being implemented on a BMC 230. Nevertheless, it is contemplated that the D-Bus service simulation method 500 may be implemented on any computing device (e.g., IHS 200) that is configured with D-Bus. The D-Bus service simulation method 500 may be particularly beneficial when used with BMCs 230 because, among other things, D-Bus is supported with numerous D-Bus interfaces often provided by third party developers. That is, developers would like to have the ability to re-use established open source code rather than develop the code from the ground up. The D-Bus service simulation method 500, when implemented on a BMC 230, provides a D-Bus simulation system and method that generates a D-Bus simulation service to simulate one or more properties in a D-Bus-based BMC so that the level of platform testing may be enhanced, particularly when certain services are not yet available for testing.

Initially at step 502, the method 500 generates a simulation service on a D-Bus layer 304 of the BMC 230. For example, a test script 310 running on a test engine 308 may communicate with the BMC 230 using a SSH link to instantiate the simulation server 320 on the BMC 230. Additionally, the simulation server 320 may be configured to override the service 306 it is intended to emulate. Thereafter at step 504, the method 500 stores simulation data in the simulation service 320. For example, the test engine 308 executing the test script 310, may send the simulation data 408 to the simulation service 320 through the SSH link, such that when the simulation server 320 receives the simulation data, it may store it for later use. The simulation data may include one or more property values (e.g., PSU temperature set to 135 degree Fahrenheit) that are to be generated by the service 306 being emulated. In one embodiment, the simulation data 408 may include only a subset of all the property values to be generated by the service 306 being emulated.

At a later point in time, such as when the test script 310 is being run, a request may be issued to request a property value from the simulation service 320 at step 506. For example, the test engine 308 may issue a request to a redfish interface service 306e so that it can issue the request to the simulation service 320. In one embodiment, the simulation service 320 is given the same name as the service 306 being emulated, thus other executable code, such as that running on the BMC 230 does not need to be modified to properly reference the service 306 being tested.

The simulation service 320 includes logic for determining whether to respond with a simulation property value or obtain actual property value from the service 306 that is being emulated. Thus, when the simulation service 320 receives the request, it determines whether to respond with a simulation property value or obtain actual property value from the service 306 at step 508. If the simulation service 320 is to respond with a simulated property value, processing continues at step 510 in which the simulation service 320 issues a response that includes the simulated property value back to the D-Bus client interface that issued the request at step 506.

If, however, the simulation service 320 is to respond with an actual property value from the service 306, processing continues at step 512 in which the simulation service 320 issues a request to the emulated service 306, receives a response from the emulated service 306 that includes the actual property value at step 514, and issues a response that includes the actual property value back to the D-Bus client interface that issued the request at step 506. After either of steps 510 or 514 are performed, processing continues at step 506 to receive and process other requests for simulation or actual property values from the simulation service 320.

The aforedescribed process may be performed continually during operation of the RAC 230. Nevertheless, when use of the D-Bus service simulation method 500 is no longer needed or desired, the method 500 ends.

Although FIG. 5 describes an example method 500 that may be performed to simulate data generated by a D-Bus service 306, the features of the disclosed processes may be embodied in other specific forms without deviating from the spirit and scope of the present disclosure. For example, certain steps of the disclosed method 500 may be performed sequentially, or alternatively, they may be performed concurrently. As another example, the method 500 may perform additional, fewer, or different operations than those operations as described in the present example. As yet another example, the steps of the processes described herein may be performed by an executable process other than the D-Bus service simulation system 300 as described above.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
a plurality of Desktop Bus (D-Bus) services that communicate among one another using a D-Bus;
at least one processor; and
at least one memory coupled to the at least one processor, the at least one memory having program instructions stored thereon that, upon execution by the at least one processor, cause the IHS to:
generate a D-Bus simulation service to emulate a second of one or more other D-Bus services through a D-Bus, and override the D-Bus simulation service over the second D-Bus service, wherein the D-Bus simulation service is configured to have a name similar to the second D-Bus service; and
send simulation test data to one of the other D-Bus services in response to a request from the one other D-Bus service.

2. The IHS of claim 1, wherein the IHS comprises a Baseboard Management Controller (BMC).

3. The IHS of claim 1, wherein the instructions, upon execution, cause the IHS to generate the D-Bus simulation service using a D-Busplus platform.

4. The IHS of claim 1, wherein the instructions, upon execution, cause the D-Bus simulation service to:
determine a first subset of a plurality of property values to be generated by the second D-Bus service that are obtained from the second D-Bus service; and
determine a second subset of the property values that are simulated values.

5. The IHS of claim 4, wherein the instructions, upon execution, cause the D-Bus simulation service to obtain the simulated values from a test script.

6. A Desktop Bus (D-Bus) service simulation method comprising:
generating a D-Bus simulation service to emulate a second of one or more other D-Bus services through a D-Bus, and override the D-Bus simulation service over the second D-Bus service, wherein the D-Bus simulation service is configured to have a name similar to the second D-Bus service; and
sending simulation test data to one of the other D-Bus services in response to a request from the one other D-Bus service.

7. The D-Bus service simulation method of claim 6, further comprising generating the D-Bus simulation service using a D-Busplus platform.

8. The D-Bus service simulation of claim 6, further comprising:
determining a first subset of a plurality of property values to be generated by the second D-Bus service that are obtained from the second D-Bus service; and
determining a second subset of the property values that are simulated values.

9. The D-Bus service simulation method of claim 8, further comprising obtaining the simulated values from a test script.

10. A memory storage device having program instructions stored thereon that, upon execution by one or more processors of a client Information Handling System (IHS), cause the client IHS to:
generate a D-Bus simulation service to emulate a second of one or more other D-Bus services through a D-Bus, and override the D-Bus simulation service over the second D-Bus service, wherein the D-Bus simulation service is configured to have a name similar to the second D-Bus service; and send simulation test data to one of the other D-Bus services in response to a request from the one other D-Bus service.

11. The memory storage device of claim 10, wherein the IHS comprises a Baseboard Management Controller (BMC).

12. The memory storage device of claim 10, wherein the instructions, upon execution, cause the D-Bus simulation service to:

determine a first subset of a plurality of property values to be generated by the second D-Bus service that are obtained from the second D-Bus service; and determine a second subset of the property values that are simulated values.

\* \* \* \* \*